US009560853B2

United States Patent
Taslagyan

(10) Patent No.: US 9,560,853 B2
(45) Date of Patent: Feb. 7, 2017

(54) RETURN FLOW CONVEYOR DEVICE FOR HEATING FOOD ITEMS

(71) Applicant: Aleksandr Taslagyan, South Lake Tahoe, CA (US)

(72) Inventor: Aleksandr Taslagyan, South Lake Tahoe, CA (US)

( * ) Notice: Subject to any disclaimer, the term of this patent is extended or adjusted under 35 U.S.C. 154(b) by 125 days.

(21) Appl. No.: 14/580,446

(22) Filed: Dec. 23, 2014

(65) Prior Publication Data
US 2016/0174572 A1   Jun. 23, 2016

(51) Int. Cl.
*A21B 1/48*   (2006.01)
*A23L 3/18*   (2006.01)
*A47J 37/04*   (2006.01)

(52) U.S. Cl.
CPC ...................... *A21B 1/48* (2013.01)

(58) Field of Classification Search
CPC ............. A21B 1/48; A21B 7/00; G07F 11/46; G07F 11/58; A47J 37/044; A47J 37/045; A47J 37/0688; A47J 36/38; A47J 37/0704; A47J 37/067
USPC ....... 198/456, 602; 99/443 C, 420, 419, 340, 99/427, 450, 482
See application file for complete search history.

(56) References Cited

U.S. PATENT DOCUMENTS

| 1,536,538 | A | * | 5/1925  | Stouffer  | A47J 37/0857 126/41 C |
| 1,555,336 | A | * | 9/1925  | Vaughan   | A47J 37/0857 126/41 C |
| 1,678,337 | A | * | 7/1928  | Halifax   | A47J 37/0857 221/279 |
| 2,014,595 | A | * | 9/1935  | Simmons   | A47J 37/0857 99/355 |
| 2,025,967 | A | * | 12/1935 | Wilputte  | C10B 25/06 202/248 |
| 2,046,832 | A | * | 7/1936  | MacFarlane| A21B 3/18 425/444 |
| 2,112,309 | A | * | 3/1938  | Santillan | A21B 5/08 126/41 C |
| 2,138,813 | A | * | 12/1938 | Bemis     | A47J 37/045 198/465.3 |
| 2,201,402 | A | * | 5/1940  | Knaust    | A21B 5/02 99/355 |
| 2,205,106 | A | * | 6/1940  | Paterson  | A21C 15/00 193/2 R |
| 2,207,795 | A | * | 7/1940  | Grimm     | A21C 3/02 100/76 |
| 2,369,840 | A | * | 2/1945  | Nalbach   | A21B 1/48 198/799 |

(Continued)

*Primary Examiner* — Eric Stapleton
(74) *Attorney, Agent, or Firm* — Thomas Frost

(57) ABSTRACT

A return flow conveyor device for warming food product includes an inlet tray upon which to place the food product, an outlet tray and a platform to transfer the food product from the inlet tray to the outlet tray, warming the product within a warming compartment of a housing. Positioning means are provided to move the platform. The platform is pivotally connected to the positioning means so that the platform may be positioned horizontally, vertically or combination thereof, during the cycling process. Transportation platform as well as inlet and outlet trays have arrays of appendages which pass in-between each other making possible for the transportation platform to pick up a food item from the inlet tray and after passing it by the heating elements depositing a food item onto the outlet tray.

8 Claims, 13 Drawing Sheets

(56) References Cited

U.S. PATENT DOCUMENTS

| | | | | |
|---|---|---|---|---|
| 2,390,455 A | * | 12/1945 | Nalbach | A21B 1/48 198/798 |
| 2,414,164 A | * | 1/1947 | Nalbach | A21B 1/48 198/798 |
| 2,611,472 A | * | 9/1952 | Perky | A21B 1/48 198/408 |
| 2,839,651 A | * | 6/1958 | Erickson | B65G 69/20 198/846 |
| 3,034,455 A | * | 5/1962 | Roth | A21B 7/00 198/597 |
| 3,227,501 A | * | 1/1966 | Austin | G07F 9/105 211/162 |
| 3,369,479 A | * | 2/1968 | Oppenheimer | A47J 37/1214 198/403 |
| 3,448,678 A | * | 6/1969 | Burstein | A21B 1/48 198/848 |
| 3,458,025 A | * | 7/1969 | Earle | B66B 29/06 198/325 |
| 3,589,274 A | * | 6/1971 | Murray | A47J 37/044 118/13 |
| 3,861,290 A | * | 1/1975 | Ringo | A47J 37/042 99/421 P |
| 3,935,807 A | * | 2/1976 | Main | A21B 1/46 99/352 |
| 4,044,660 A | * | 8/1977 | Montague | A47J 37/0857 221/253 |
| 4,108,333 A | * | 8/1978 | Falk | G07F 9/105 198/817 |
| 4,143,664 A | * | 3/1979 | Chorney | A01F 11/06 460/1 |
| 4,189,631 A | * | 2/1980 | Baker | A47J 37/044 219/385 |
| 4,274,551 A | * | 6/1981 | Hicks | A47J 37/045 221/150 R |
| 4,276,976 A | * | 7/1981 | Dunstan | B66B 21/12 198/334 |
| 4,281,594 A | * | 8/1981 | Baker | A47J 37/044 99/386 |
| 4,413,719 A | * | 11/1983 | White | B66B 23/14 198/333 |
| 4,499,973 A | * | 2/1985 | De Lorenzi | B66B 1/20 187/385 |
| 4,800,998 A | * | 1/1989 | Myrick | B66B 29/06 198/323 |
| 4,927,003 A | * | 5/1990 | Swinderman | B65G 45/12 15/256.5 |
| 5,210,387 A | * | 5/1993 | Smith | A21B 1/245 219/679 |
| 5,381,687 A | * | 1/1995 | Nguyen | B66B 29/06 73/1.08 |
| 5,392,696 A | * | 2/1995 | Navarro | B65G 47/44 198/403 |
| 5,458,415 A | * | 10/1995 | Poilane | A21D 8/02 366/138 |
| 5,473,975 A | * | 12/1995 | Bruno | A47J 37/0857 219/388 |
| 5,606,904 A | * | 3/1997 | Fabbri | A21C 9/08 126/21 A |
| 5,798,038 A | * | 8/1998 | Huber | E03F 5/14 198/670 |
| 5,839,354 A | * | 11/1998 | Cardillo | A47J 37/0857 99/329 RT |
| 5,992,605 A | * | 11/1999 | Haruta | B66B 31/006 198/333 |
| 6,382,389 B1 | * | 5/2002 | Mehlert | B66B 23/24 198/335 |
| 6,426,104 B1 | * | 7/2002 | Leitinger | A23L 1/31 426/243 |
| 6,810,792 B1 | * | 11/2004 | Knight | A47J 36/38 99/340 |
| 6,976,571 B2 | * | 12/2005 | Schops | B66B 29/06 198/323 |
| 6,994,204 B2 | * | 2/2006 | Buescher | B66B 31/00 198/335 |
| 6,997,705 B2 | * | 2/2006 | Tang | B23K 1/008 126/21 A |
| 7,201,269 B2 | * | 4/2007 | Buscher | B66B 31/00 198/335 |
| 7,234,583 B2 | * | 6/2007 | Illedits | B66B 29/06 198/324 |
| 7,357,241 B2 | * | 4/2008 | Schmidt | B66B 23/12 198/327 |
| 7,597,181 B2 | * | 10/2009 | Illedits | B66B 29/06 198/325 |
| 8,104,600 B2 | * | 1/2012 | Sanchez Pineiro | B66B 21/08 198/333 |
| 8,424,668 B2 | * | 4/2013 | Gonzalez Alemany | B66B 29/06 198/324 |
| 8,516,952 B2 | * | 8/2013 | Bennett | A47J 37/044 99/419 |
| 8,827,068 B2 | * | 9/2014 | Weiss | A21B 1/48 198/456 |
| 8,967,364 B2 | * | 3/2015 | Kleine-Bruggeney | B66B 23/12 198/322 |
| 2004/0099503 A1 | * | 5/2004 | Ogimura | B66B 23/026 198/321 |
| 2005/0013087 A1 | * | 1/2005 | Wu | H01G 5/06 361/303 |
| 2005/0061610 A1 | * | 3/2005 | Buescher | B66B 31/00 198/335 |
| 2005/0279610 A1 | * | 12/2005 | Ossendorf | B66B 21/10 198/321 |
| 2006/0021850 A1 | * | 2/2006 | Buescher | B66B 31/00 198/335 |
| 2006/0096834 A1 | * | 5/2006 | Illedits | B66B 29/06 198/325 |
| 2007/0144865 A1 | * | 6/2007 | Jarvis | B66B 29/06 198/325 |
| 2007/0275811 A1 | * | 11/2007 | Starik | B62M 11/16 475/259 |
| 2008/0236992 A1 | * | 10/2008 | Illedits | B66B 29/06 198/325 |
| 2011/0000762 A1 | * | 1/2011 | Gonzalez Alemany | B66B 21/10 198/321 |

\* cited by examiner

RETURN FLOW CONVEYOR DEVICE FOR HEATING FOOD ITEMS

BACKGROUND OF INVENTION

The present invention relates to a continuous motion return flow conveyor allowing food product to be processed while heating without having to turn the product.

It is an object of the invention to prevent the overturning of food product in return flow toasters.

SUMMARY OF THE INVENTION

The general purpose of the present invention, which will be described subsequently in greater detail, is to provide a continuous flow conveyor for heating food products, such as: hamburgers on a bun with cheese, sandwich buns with ingredients to be preheated or toasted before serving, basket of fries with cheese on top to be melted, and other cases where it is necessary to prevent the food product to be flipped over during processing.

To attain this, the present invention has a conveyor disposed within a heating compartment formed within a housing having platforms with extending appendages attached to drive chains with a pin connection allowing the platforms to pivot freely axially through left and right connection points to the left and right drive chains, respectively. At the beginning of the cycle food product is loaded on an inlet tray. An outlet tray is positioned below the inlet tray. The inlet and outlet trays have extending appendages that are oriented and complimentary to the appendages of the platform. The platforms can freely pass the inlet and outlet trays during cycling.

When one of the platforms approach the inlet tray from below, the platform passes the inlet tray and picks up a food item. After picking up the food item, the platform transports the item and passes it under heating elements within the chamber. After the product passes the heaters the platform moves downwardly to the outlet tray depositing the food item onto the outlet tray. As the platform moves forward it contacts a motion guide forcing the platform to pivot as it moves upwardly to the inlet tray for another cycle. More than one platform can be attached to the drive chains.

The conveyor is utilized for commercial toaster applications, but also can be utilized in any other application where it is necessary to keep items from being flipped over as the food product moves through the conveyor.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Referring initially to the drawings FIGS. 1 to 4, generally, the present invention 10 will now be described in greater detail. A housing 12 comprises a frame having a top wall, bottom wall, side walls, a front wall with an opening for passage therethrough, and a base wall. The frame is constructed with inner and outer panels with inner panels defining a heating compartment therein.

Conventional heating elements 14 are mounted to the inner panels within the compartment. The heating elements are not limited in scope to any particular type.

Figure 5:
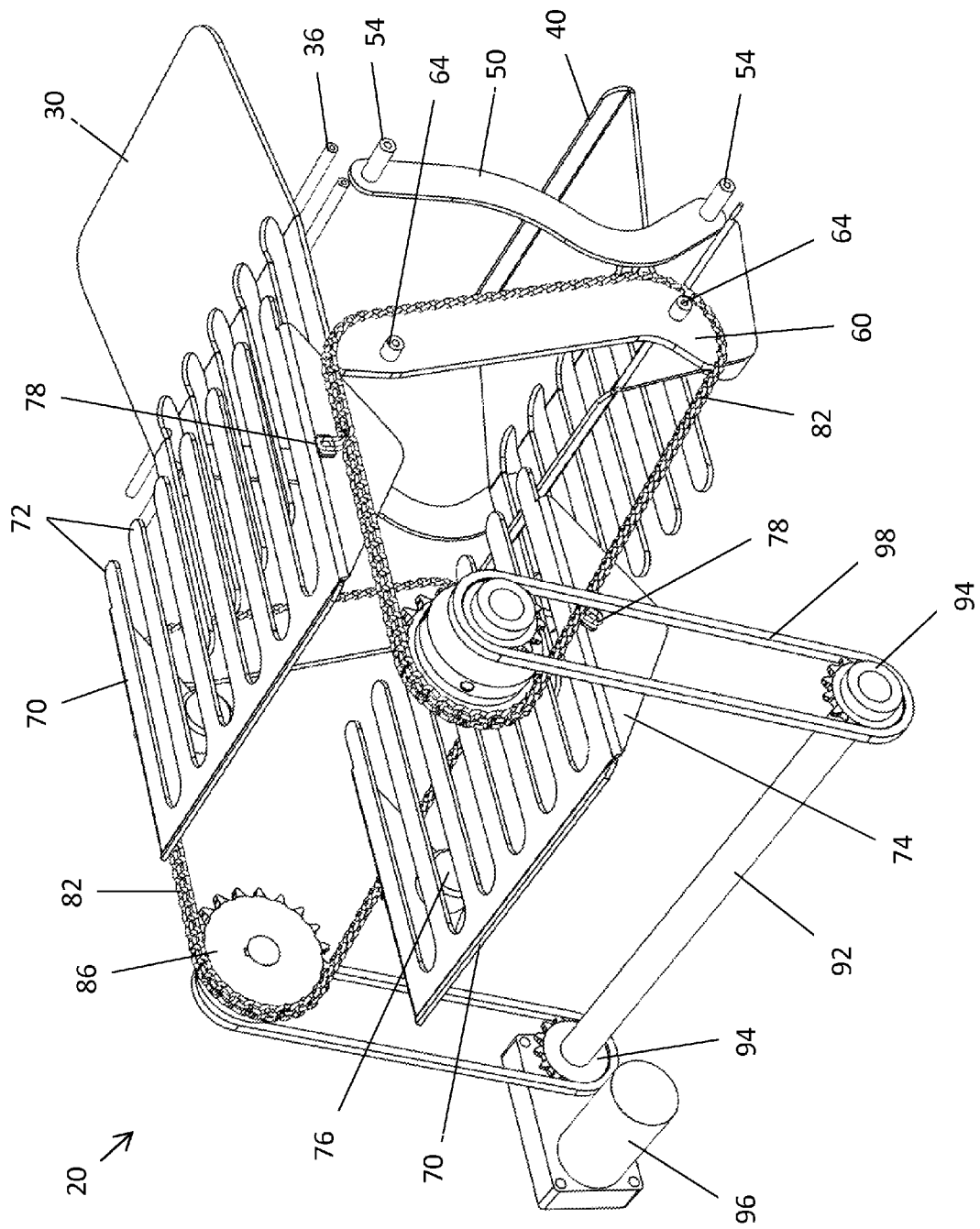
FIG. 5 is a perspective view of a conveyor of the present invention.
Figure 6:
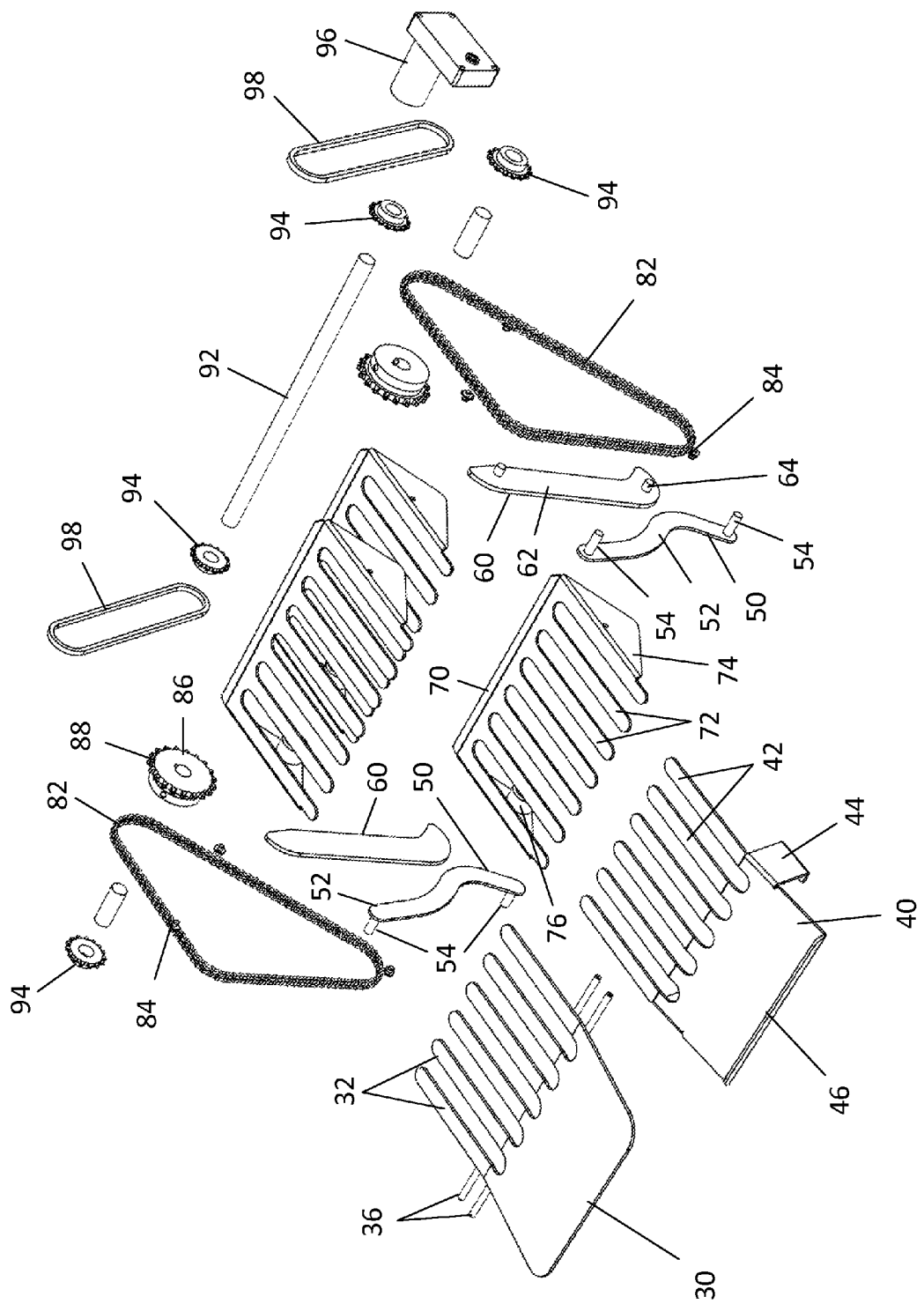
FIG. 6 is an exploded view of the conveyor.

A conveyor 20 is illustrated in FIGS. 5 and 6. The conveyor 20 is disposed within the heating compartment of the housing 12. An inlet tray 30 is arranged and sized to receive food product. The inlet tray 30 has an array of appendages 34 with spacing defined between the appendages. The inlet tray 30 is attached to the side walls on left and right by mounting posts 36 and is detachable.

An outlet tray 40 is arranged and sized to receive food product. The outlet tray has an array of appendages 42 with spacing defined between the appendages. The outlet tray 40 is attached to the side walls on left and right by mounting feature 44 and is detachable.

A motion guide member 50 comprises a sinusoidal shaped panel 52 having a pair of arms 54. The arms 54 are detachably mountable to the inner side walls of the frame. A chain track member 60 comprises a panel 62 having a pair of arms 64, and is also detachably mountable to the inner side walls of the frame.

The conveyor 20 further comprises at least one platform 70 which has an array of appendages 72 protruding towards the trays 30 and 40 with spacing defined between the appendages. There is a pair of opposed downwardly depending side plates 74 with counter-weights 76 mounted to side plates 74. The purpose of the counterweights 76 is to counter balance the weight of a food item on the platform 70 and keep the platform 70 horizontal. A pin 78 is attached to outer surfaces of the side plates 74.

Figure 7:
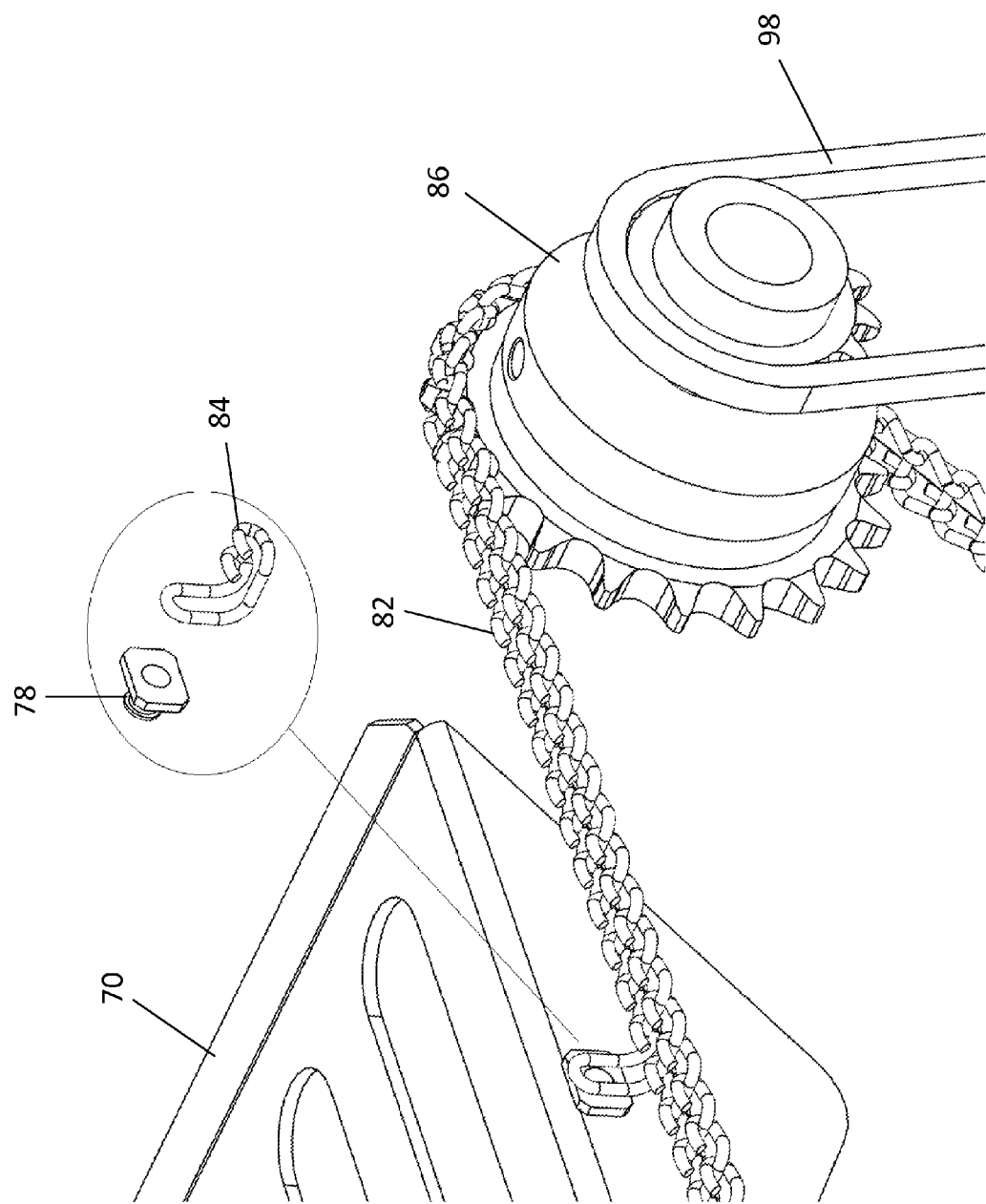
FIG. 7 is a fragmentary view of a platform connected to drive chain.

The platform 70 is pivotally and securely coupled to positioning means 80. The positioning means 80 move the platform toward and away from the inlet tray 30 and the outlet tray 40. The positioning means 80 is preferably a pair of opposed drive chains 82. As illustrated in FIG. 7, the pin 78 of the platform 70 is welded to a mounting chain link 84 of the drive chains 82. The counter-weights 76 of the platform 70 maintain the platform 70 in a horizontal position until rotated. The pin 78 connection allow the platforms 70 to pivot freely axially through left and right connection points to the left and right drive chains 82, respectively. It should be recognized that more than one platform 70 can be connected to the drive chains 82 during operation. The platform 70 can be positioned horizontally, vertically, or a combination thereof.

The appendages 72 of the platform 70 and the appendages 32, 42 of the inlet tray 30 and outlet tray 40 are oriented relative to each other so that the appendages of the platform are dimensioned to extend through the spacing between the appendages of the inlet tray and outlet tray, and pick-up and deposit food product accordingly.

Figure 8:
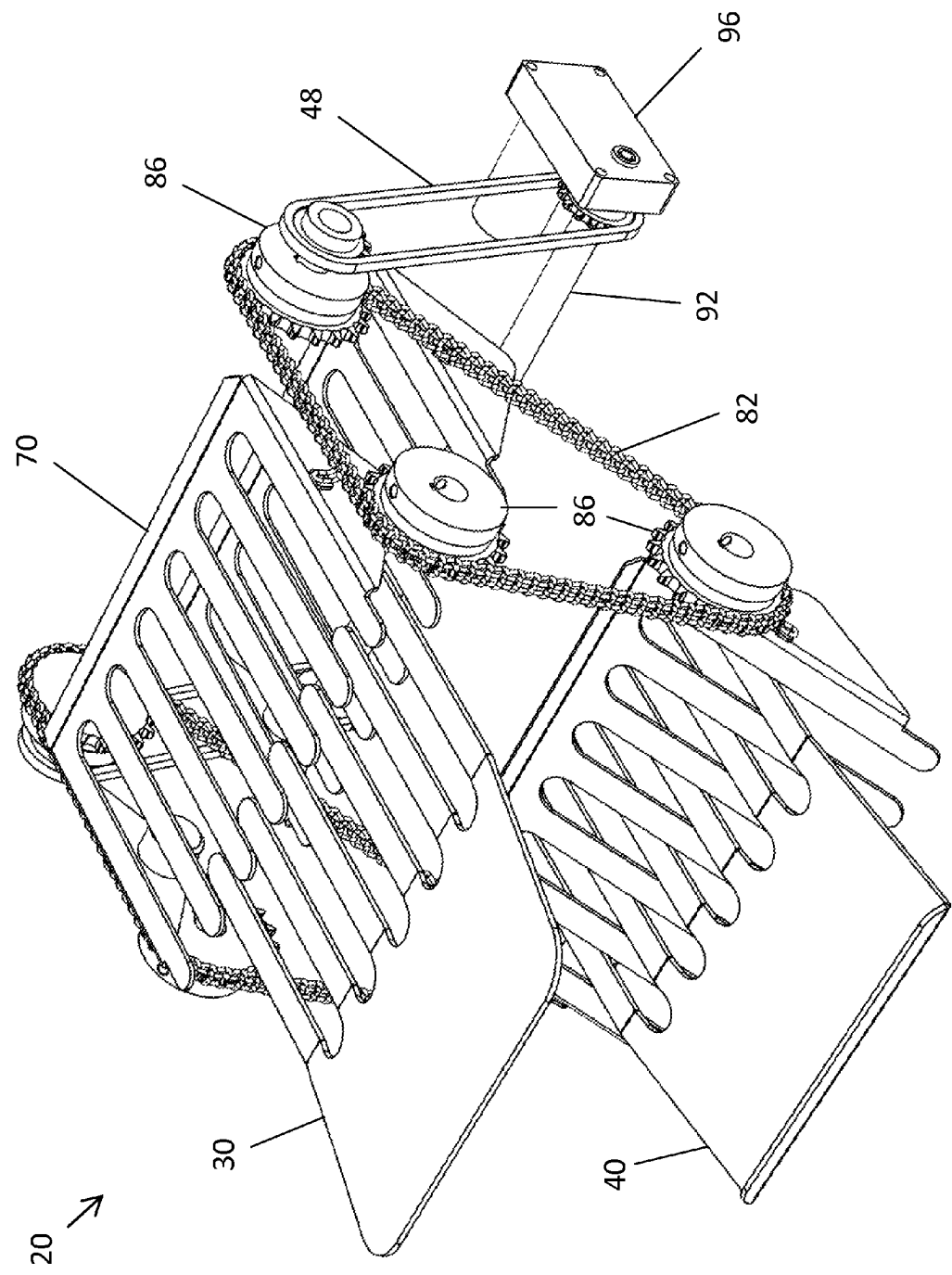
FIG. 8 is a perspective view of a first alternate embodiment of the conveyor.

The positioning means 80 further comprises a pair of opposed drive sprockets 86 with gear teeth 88, which are mounted to the inner panels of the frame. The drive chains 82 are aligned with the chain track members 60 and mesh with the gear teeth 88 of the drive sprockets 86. As shown in FIG. 8, an additional pair of drive sprockets 86 can substitute for the chain track members 60.

Figure 1:
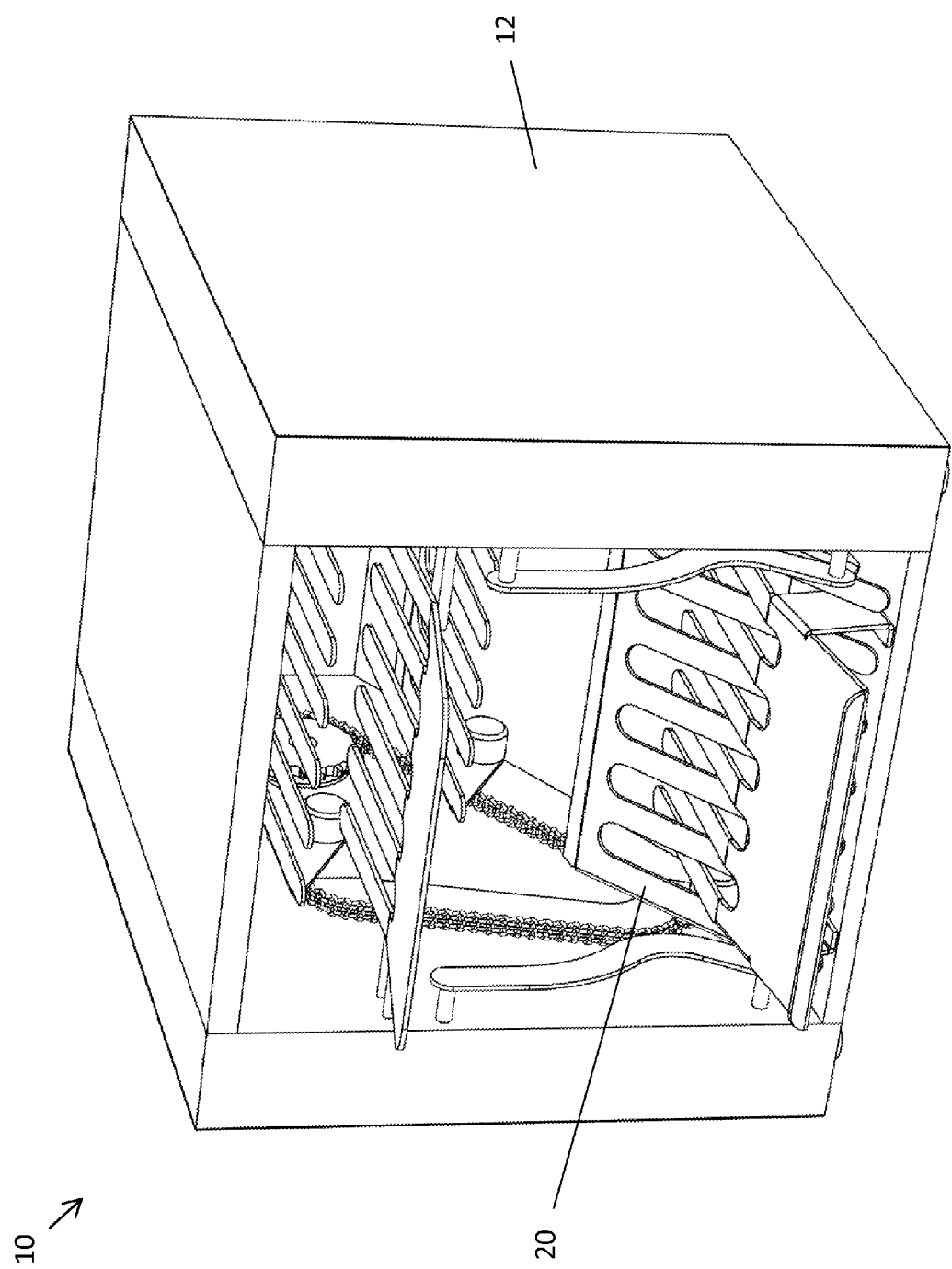
FIG. 1 is a perspective of the present invention.
Figure 2:
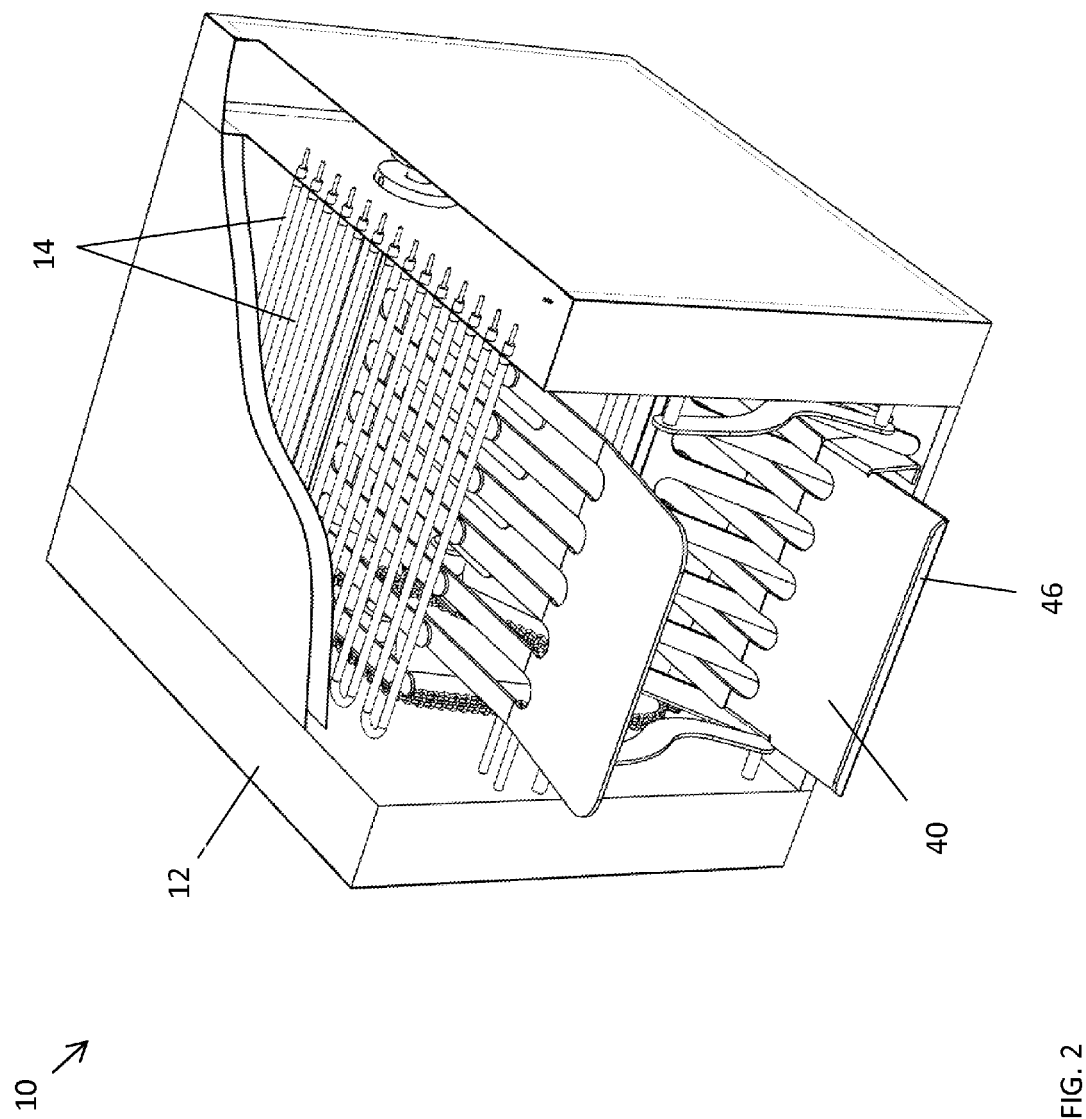
FIG. 2 is a cut-away view illustrating heating elements of a housing.
Figure 3:
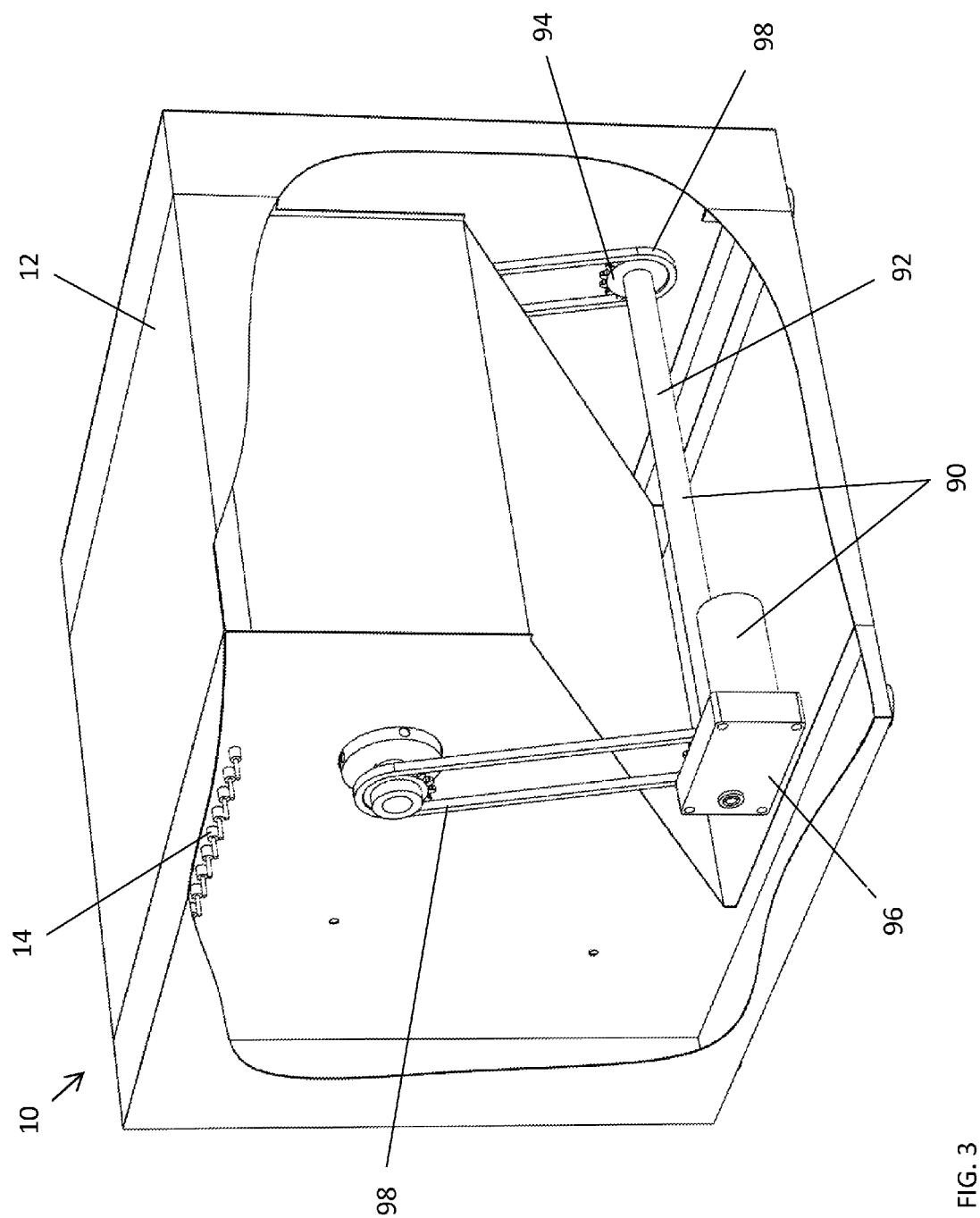
FIG. 3 is a cut-away view illustrating power mechanism.

Referring to FIG. 3, a power mechanism 90 to propel the conveyor 20 is illustrated. An output shaft 92 is coupled to a pair of power drive sprockets 94 formed at opposed ends. A drive motor 96 is electronically connected to a power source (not shown). Drive chains 98 are engaged with the drive sprockets 94 and propel the positioning means 80. When the power drive sprockets 94 are turned by the motor 96 turning the shaft 92, the power chains 98 are pulled, putting mechanical force into the system.

Figure 9:
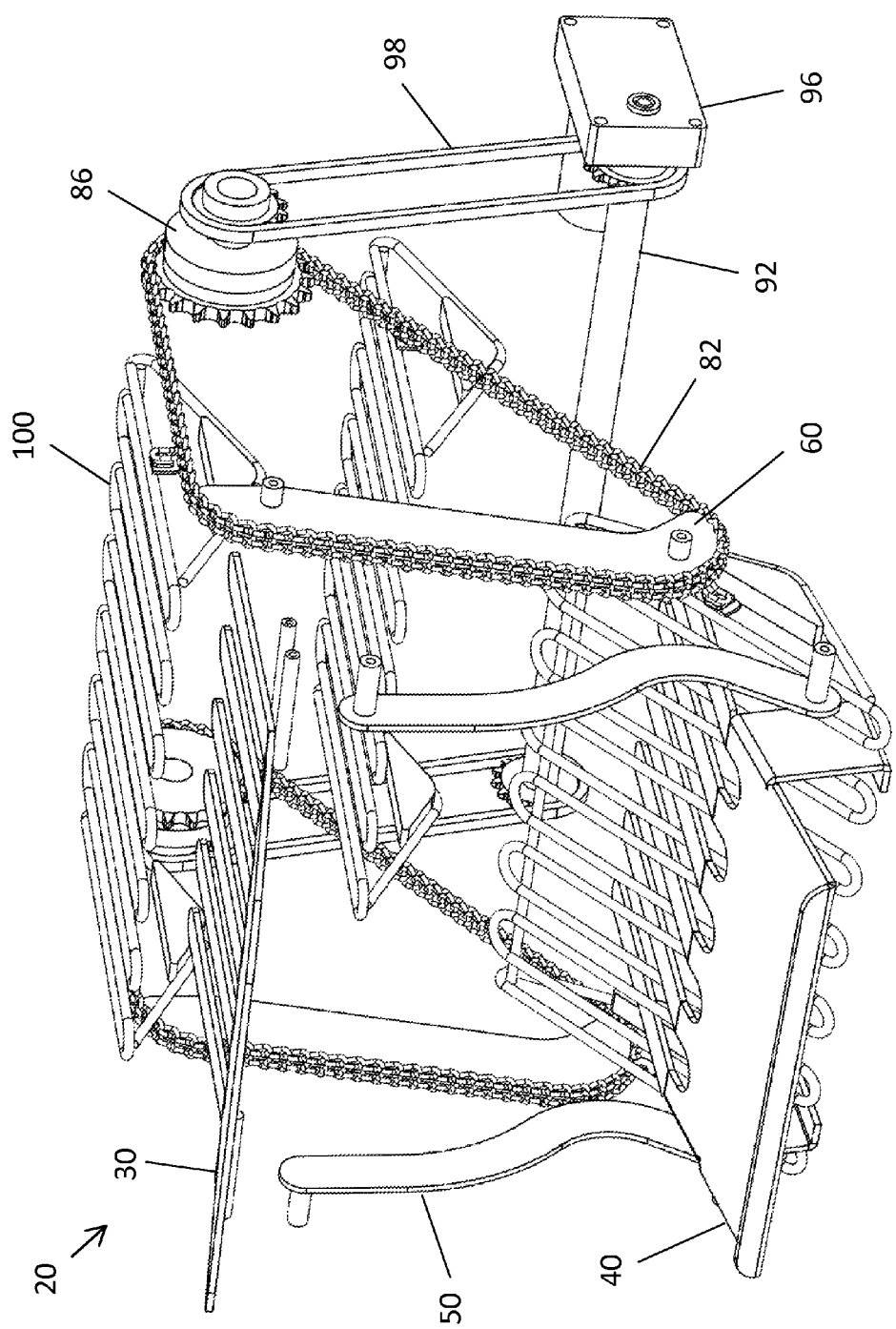
FIG. 9 is a perspective view of a second alternate embodiment of the conveyor.
Figure 10:
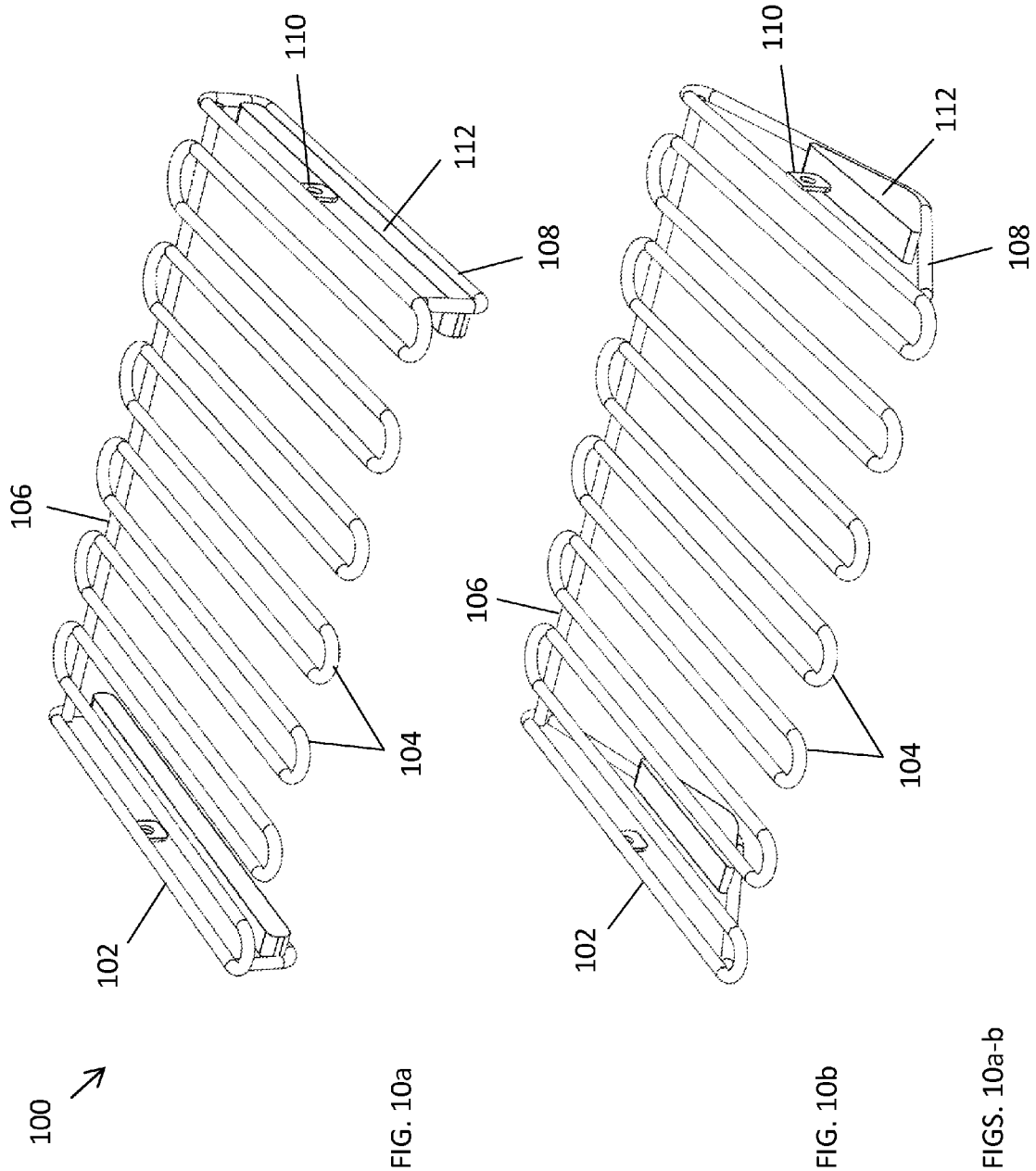
FIGS. 10a-b are perspective views of a second platform.
Figure 11:
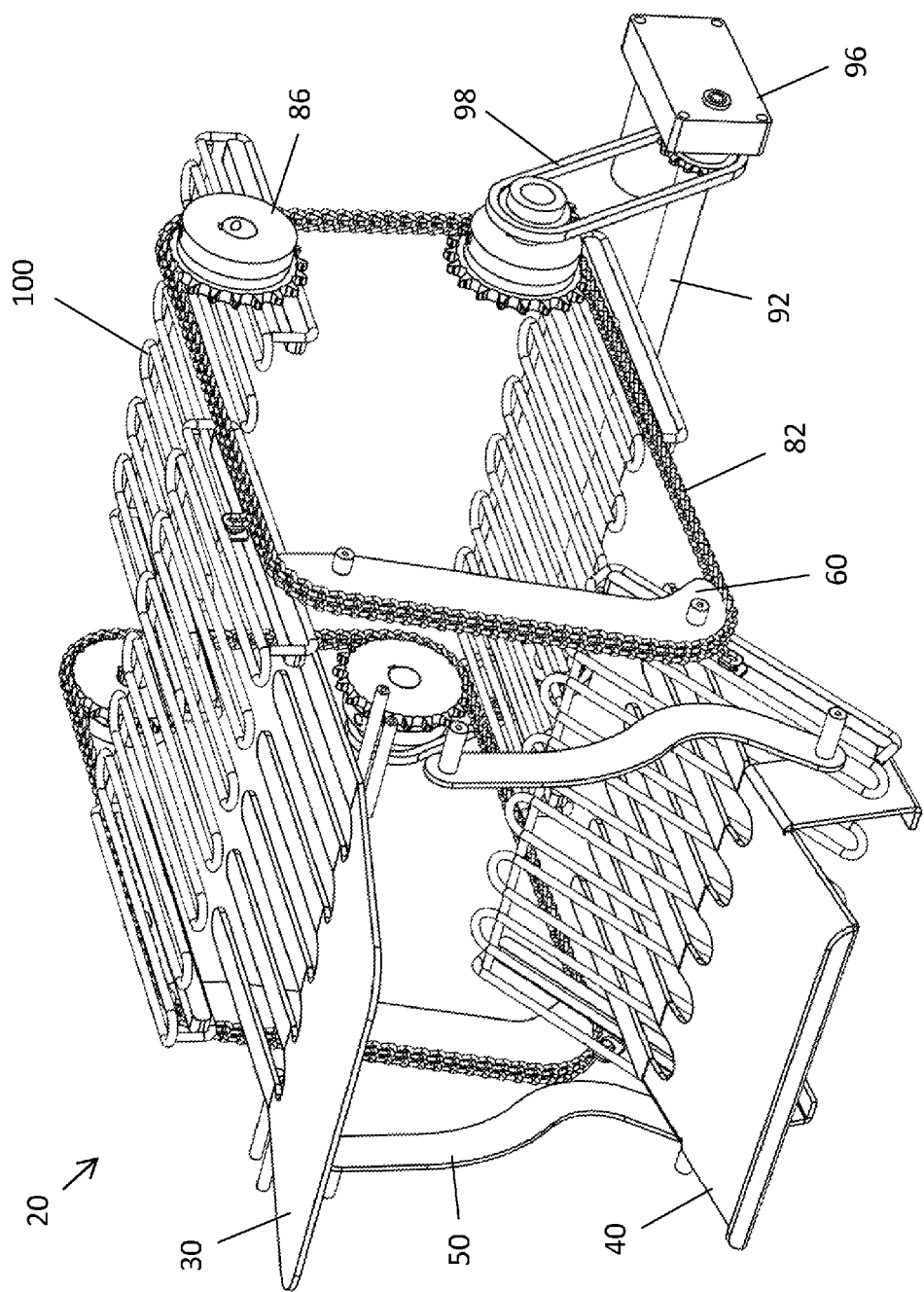
FIG. 11 is a perspective view of a third alternate embodiment of the conveyor.
Figure 12:
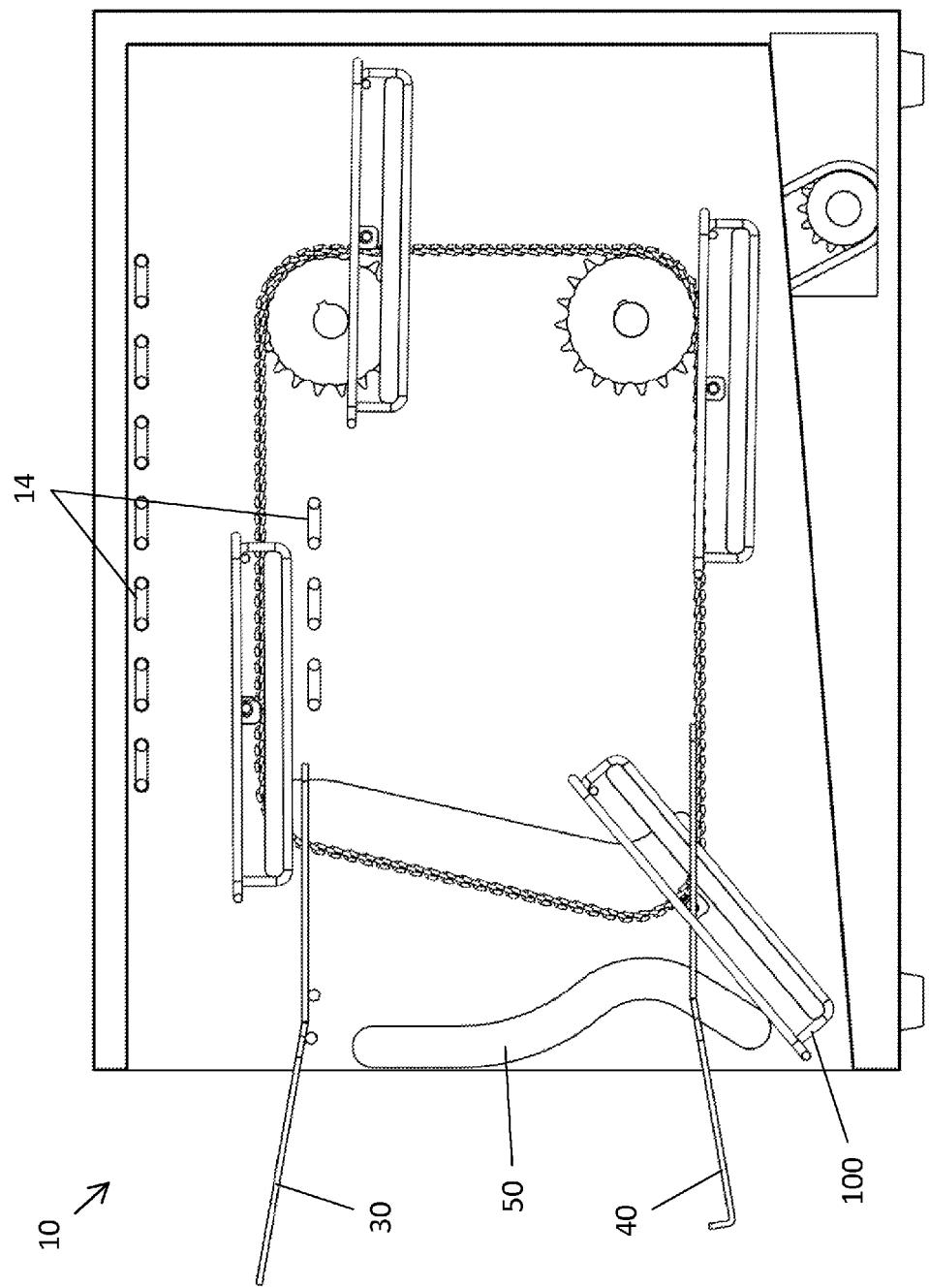
FIG. 12 is a cut-away view of third embodiment of conveyor
Figure 13A:
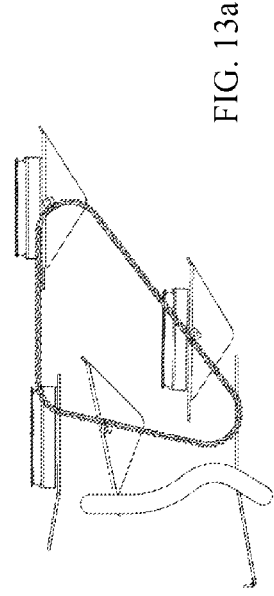
FIGS. 13a-f are illustrated numbered consecutive steps of conveyor operation
Figure 13B:
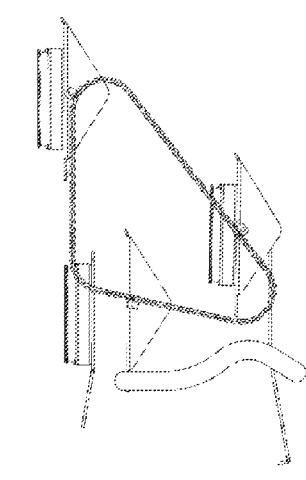
Figure 13C:
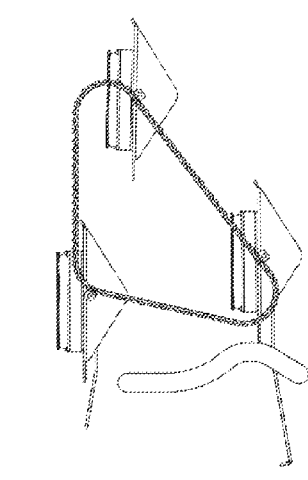
Figure 13D:
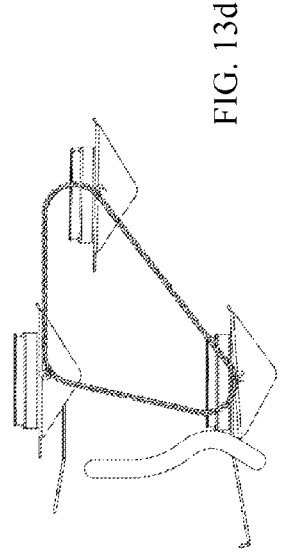
Figure 13E:
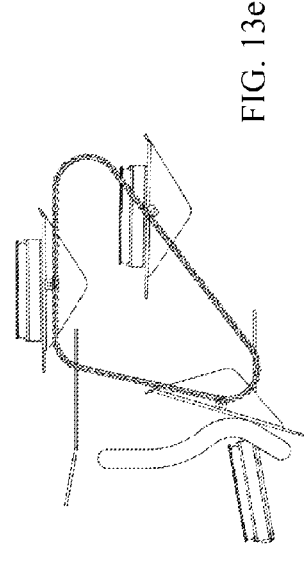
Figure 13F:
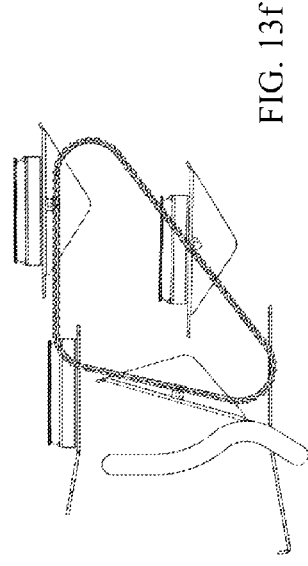

As illustrated in FIGS. 9 and 10*a-b*, alternative embodiments of the conveyor 20 with a wire rack versions of a platform 100 are illustrated. A frame 102, generally formed of tubular construction, has a plurality of a co-planer set of appendages 104 with spacing there between, aligned perpendicularly to each other, and mounted on a rod 106. There are opposed generally triangular shaped members 108 depending downwardly. A mounting plate 110 is provided to mate with a pin to affix platforms 100 to the drive chains 82. Counter-weights 112 are integrally formed on the members 108.

Figure 4:
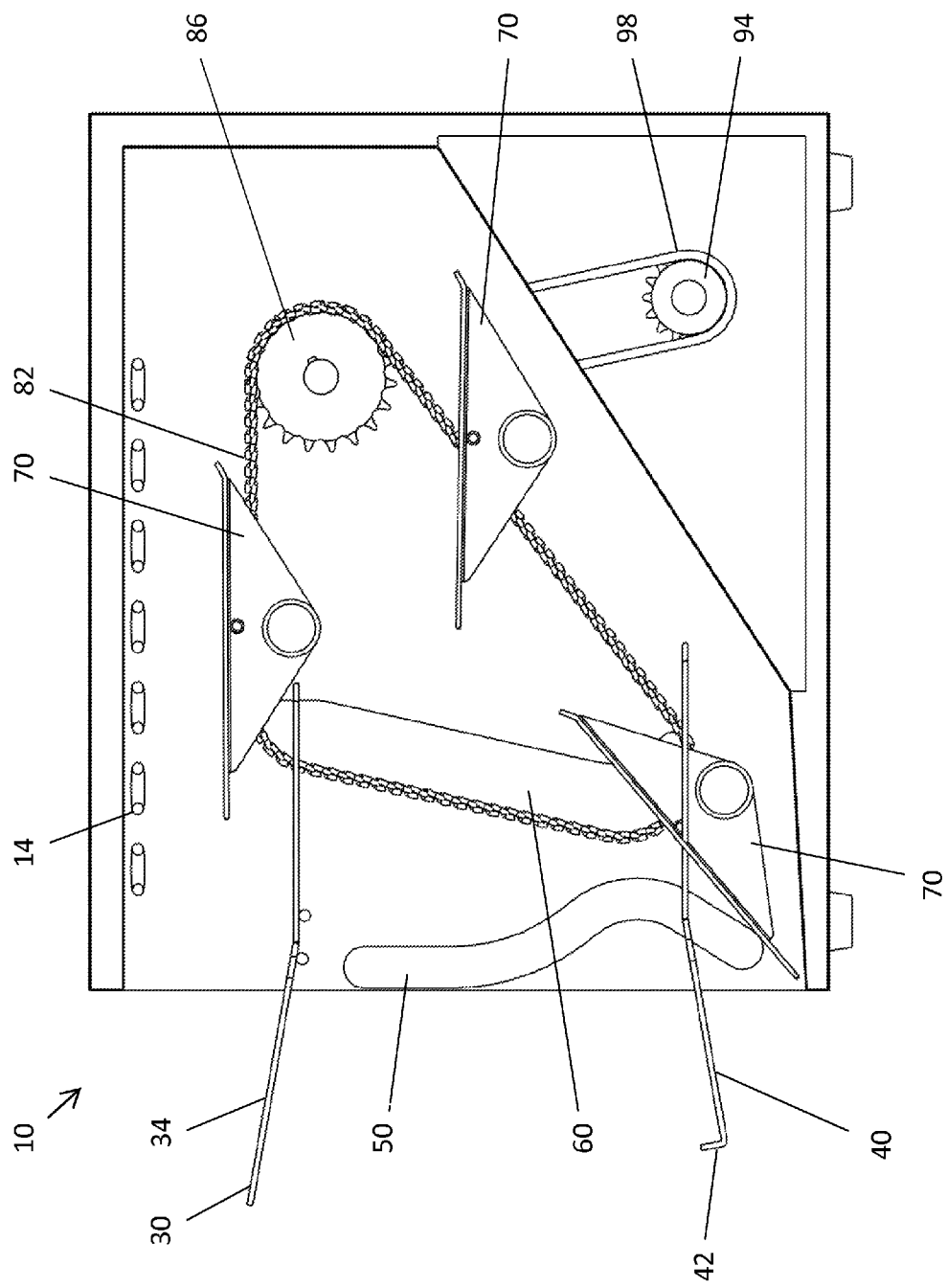
FIG. 4 is a cross-sectional side view of the present invention.

The general configuration of the invention 10 in use is illustrated in FIG. 4. At the beginning of the cycle food product is loaded on the inlet tray 30. The outlet tray 40 is positioned below the inlet tray 30. The inlet tray 30 and outlet tray 40 have extending appendages 32, 42 that are oriented and complimentary to the appendages 72 of the platform or platforms 70. The platforms can freely pass the inlet and outlet trays during cycling. When one of the platforms approach the inlet tray from below, the platform passes the inlet tray and picks up a food product. After picking up the food product, the platform transports the product (for example a hamburger on a bun with cheese), and passes it under heating elements 14 within the heating compartment of the housing 12. After the product passes the heating elements the platform moves downwardly to the outlet tray depositing the food item onto the outlet tray for removal. As the platform moves forward it contacts the motion guide member 50 forcing the platform to pivot as it moves upwardly to the inlet tray for another cycle. As shown, more than one platform can be attached to the drive chains 82. In FIGS. 13*a-f* it is illustrated how food products cycle through the conveyor 20 in six consecutive steps.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

I claim:

1. A device for warming food product, comprising in combination:
   a housing having a top wall, side walls, a bottom wall, and a front wall with a passage defined therethrough; and further having inner panels and outer panels with a heating compartment defined therein;
   heating elements mounted to the inner panels;
   positioning means disposed in the housing;
   an inlet tray having a first end and a second end, substantially opposed planer surfaces, a plurality of co-planer set of appendages with spacing there between, aligned perpendicularly to each other, and extending from the second end, and a planer portion sloped downwardly to the appendages;
   an outlet tray having a first end and a second end, substantially opposed planer surfaces, a plurality of co-planer set of appendages with spacing there between, aligned perpendicularly to each other, and extending from the second end, and a planer portion sloped downwardly to an upwardly depending edge formed at the first end of the outlet tray;
   at least one platform pivotally connected to the positioning means having first and second substantially opposed planer surfaces, a first end and a second end, a plurality of co-planer set of appendages with spacing there between, aligned perpendicularly to each other, and extending outwardly from the first end;
   a pair of opposed braces extending downwardly from a bottom surface of the outlet tray;
   a power source; and
   whereby the positioning means moves the platform toward and away from the inlet tray to the outlet tray during a warming process of food product.

2. The device as set forth in claim 1, further comprising outwardly extending posts integrally formed on the inlet tray to detachably mount the inlet tray to the inner panels of the housing.

3. The device as set forth in claim 2, whereby the platform further comprises a pair of opposed downwardly depending side walls with counter-weights mounted to inner surfaces of the side walls, and a pin attached to outer surfaces of each of the side walls of the platform.

4. The device as set forth in claim 3, whereby the positioning means comprises a pair of opposed drive chains aligned with chain track members mounted to the inner panels of the housing, a pair of opposed drive sprockets with gear teeth mounted to the inner panels of the housing, and whereby the drive chains engage with the gear teeth of the drive sprockets and the pins of the platform are secured to the opposed drive trains.

5. The device as set forth in claim 4, further comprising motion guide members detachably mountable to the heating compartment of the housing, and being positioned to engage with the counter-weights of the platforms to rotate and change position of the platforms from horizontal to vertical orientation.

6. A device for warming food product, comprising in combination:
   a housing having a top wall, side walls, a bottom wall, and a front wall with a passage defined therethrough; and further having inner panels and outer panels with a heating compartment defined therein;

heating elements mounted to the inner panels;

positioning means having a pair of opposed drive chains aligned with chain track members mounted to the inner panels of the housing, a pair of opposed drive sprockets with gear teeth mounted to the inner panels of the housing, and whereby the drive chains engage with the gear teeth of the drive sprockets;

an inlet tray having a first, end and a second end, substantially opposed planer surfaces, a plurality of co-planer set of appendages with spacing there between, aligned perpendicularly to each other, and extending from the second end, and a planer portion sloped downwardly to the appendages;

an outlet tray having a first end and a second end, substantially opposed planer surfaces, a plurality of co-planer set of appendages with spacing there between, aligned perpendicularly to each other, and extending from the second end, and a planer portion sloped downwardly to an upwardly depending edge formed at the first end of the outlet tray;

at least one platform pivotally connected to the positioning means, comprised of a frame mounted on a rod having a plurality of co-planer appendages with spacing there between, and align perpendicular to each other, a pair of generally triangular shaped members affixed at opposed side ends of the frame, pair of mounting plates affixed to the frame and the members at opposed side ends of the frame to affix the platform to the drive chains of the positioning means;

a power source; and whereby the drive chains moves the platform toward and away from the inlet tray to the outlet tray during a warming process of food product.

7. The device of claim 6, whereby the power source comprises a drive motor engaged with an output shaft coupled to a pair of power drive sprockets formed at opposed ends, and further whereby power chains engage with the power drive sprockets and drive sprockets to propel the drive chains.

8. The device of claim 6, whereby the frame is generally formed of tubular construction.

* * * * *